Nov. 25, 1952  A. H. DOOLITTLE  2,619,314
BIRD CAGE SUPPORT
Filed Sept. 25, 1947
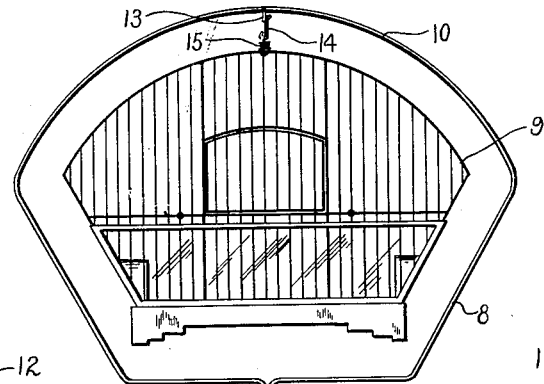
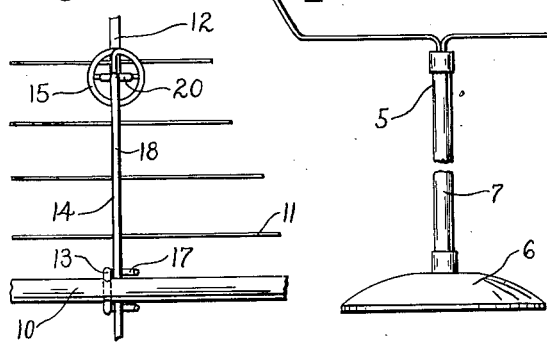
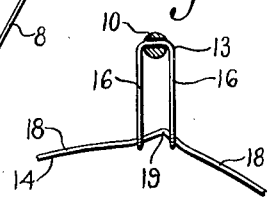
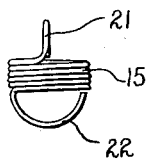
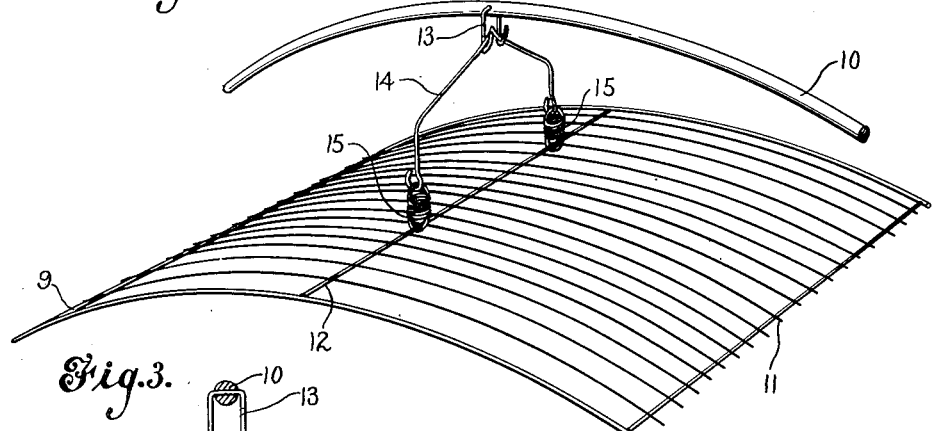
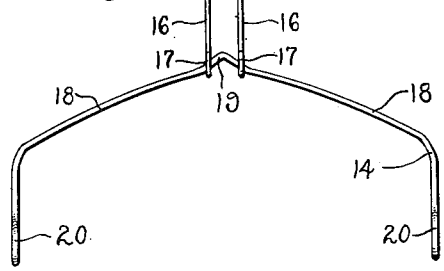
Inventor
Andrew H. Doolittle
By Rockwell Bartholow
Attorneys Patented Nov. 25, 1952

2,619,314

UNITED STATES PATENT OFFICE 2,619,314

BIRD CAGE SUPPORT

Andrew H. Doolittle, North Haven, Conn., assignor to The Andrew B. Hendryx Company, New Haven, Conn., a corporation of Connecticut Application September 25, 1947, Serial No. 775,986

2 Claims. (Cl. 248—317)

This invention relates to bird cage assemblies, and more particularly to the means whereby the bird cage is resiliently suspended from a carrying frame, which carrying frame is usually a part of a stand upon the upper end of which the frame is supported.

In the past, it has been common practice to employ a stand having an open frame in which the cage is resiliently supported. However, the provisions for connecting the cage with the upper end portion or arch of the frame have been unsatisfactory. Among other things, the cage was not supported in a sufficiently stable manner, and it was apt to swing out of the general plane of the supporting frame and remain in a displaced position, or to take other displaced positions, owing to the fact that its movement with respect to the supporting frame was not sufficiently controlled.

One of the objects of the present invention is to overcome these drawbacks.

Another object is to provide an assembly in which lateral movement of the cage is controlled in a satisfactory manner, and in which the cage-supporting means is of improved structure and functions in an improved manner.

In the accompanying drawing:

Fig. 1 is a front elevation of a bird cage assembly embodying the invention;

Fig. 2 is a fragmentary perspective view showing on a larger scale certain parts illustrated in Fig. 1;

Fig. 2A is a fragmentary plan view of certain parts shown in Fig. 2;

Fig. 3 is a transverse section taken through the arch of the frame, illustrating the suspension of the bail, certain parts being omitted;

Fig. 3A is an illustrative view hereinafter mentioned; and

Fig. 4 is an elevation of one of the suspending springs.

In Fig. 1, a bird cage stand is generally indicated at 5, the same having a base 6, an upright rod 7, and an open frame 8 in which a bird cage 9 is supported. The frame 8 is formed of a rod which has an upper arch portion 10 from which the cage is suspended. Stands of this general type are commonly used. The bird cage 9, illustrated herein, is of a type that is customarily used, in that the upper part of the cage is of openwork construction having longitudinal wires 11 and a heavier middle transverse wire 12, the latter being utilized in suspending the cage from the arch 10.

In the present case the suspension means includes the following parts: A duplex swinging hook 13 connected to the arch 10; a wire bail 14 having an upper middle portion engaging the hook 13; and two helical suspension springs 15 connecting the ends of the bail with the cross wire 12.

The duplex swinging hook 13 is constructed of wire, having a generally U-shaped body 16 and bent-up lower ends 17. The upper connecting portion of the body 16 passes through a transverse hole provided in the arch 10, as shown in Fig. 3. The connecting portion is somewhat loose in the hole so that the hook can swing in the plane of the frame of the stand, but the hook is held against displacement in a lateral direction owing to the fact that the side members or legs of the hook are bent downwardly as shown. The bail 14 is preferably constructed of wire so as to be generally in the form of an inverted U having slanting side portions 18 at the upper part, said side portions 18 being in upwardly converging relation. In the region where the side portions 18 of the bail are joined to each other, a portion 19 is provided which is of special shape, namely, in the shape of a wide inverted V. This V portion of the bail is adapted to be received in the hooks provided at the lower end of the member 13, and the relation of the parts when assembled is as shown in Fig. 3. The under portion of the bail is engaged with the upper surfaces of the two hooks 17, and the said under portion is in the shape of a wide shallow V in which portions of the hooks 17 are received when the parts are in the normal position shown in Fig. 3.

The lower ends of the bail 14 are formed to provide integral hooks 20 in which are received the upper end portions of the spring coils 15, said upper end portions being indicated at 21. The lower end portions of the coils 15 are indicated at 22, and these portions are engaged with the cross wire 12 of the cage body in spaces between certain of the wires 11. The bail 14 and the supporting springs 15 are disposed symmetrically with respect to the median vertical plane of the cage body, so that the cage body will have a horizontal position. It will be noted that the respective ends of each supporting spring are bent to create attaching loop portions, which, in the assembled position of the cage, are in vertical planes, the vertical plane of one end portion, however, being at right angles to the vertical plane of the opposite end portion.

By providing a suspension such as previously described, the cage body is resiliently supported from the stand, which is a desirable feature. The cage can have some movement with respect to the stand as a result of the spring connection, and vibrations and shocks imparted to the stand are not transmitted to the cage. The suspension described also permits the cage to swing in a longitudinal vertical plane as the bird moves about in the cage, and this is a desirable feature. However, displacement of the cage by turning with reference to a vertical axis is kept under control by the described construction, there being a distinct tendency for the longitudinal center line of the cage to remain in the plane of the supporting frame. The tendency is to resist rotation about an upright axis, or a sidewise tipping action. The tendency is also to restore the cage to the initial lined-up position after it has been displaced by a rotational movement or a sidewise tipping movement. These tendencies are due to the construction previously described, and more especially to the provision of the V-shaped or pointed middle portion of the bail engaging with the hooks of the duplex suspending member in the manner previously described.

Supposing, for example, that the cage is given a sidewise tipping movement. This may bring the middle part of the bail into a relation with the two suspending hooks, such as shown in Fig. 3A. Under such circumstances, one hook engages a portion of the bail that is disposed at a certain angle, and the other hook engages a bail portion which is disposed at a different angle. The V-shaped portion of the bail acts somewhat in the nature of a cam, which, acting against the hooks, tends to cam the bail back to the initial position, and the V-shaped portion also acts somewhat in the nature of a vibration damper to dampen oscillations of the bail and its supported cage. Where the cage, if supported from a single hook, would tend to have many swings or oscillations after a sidewise tipping displacement, the double hook, co-acting with the camming portion of the bail, notably reduces such an effect.

Only one form of the invention is shown herein, but it is to be understood that various changes may be made in the details without departure from the principles of the invention or the scope of the claims.

What I claim is:

1. In a bird cage assembly, a suspending frame of rod material in the form of a loop in a vertical plane having an upper longitudinal rod portion, an elongated cage within the loop beneath said rod portion adjacent the middle of the rod portion having an upper cross wire extending substantially at right angles to said rod portion, a duplex hook engaged with said rod portion and depending therefrom and having lower hook portions at the sides thereof spaced from each other in the direction of the cross-wire length and at opposite sides of the rod portion, and a cage-supporting wire bail in a plane substantially in line with said upper cross wire suspending the cage by connections from said cross wire, said bail having as an integral part thereof at the upper middle portion a camming part in the shape of an inverted V having its sides engaged with the respective hook portions to inhibit rotation of the cage about an upright axis or a sidewise tipping action, and to assist in restoring the cage to the initial lined-up position with said rod portion after the cage has been displaced by a rotational movement or a sidewise tipping movement.

2. An assembly as defined in claim 1, in which the duplex hook is made of wire and has a middle portion passing through a transverse hole in said rod portion in a manner to permit swinging of the hook in a plane lengthwise of the rod portion.

ANDREW H. DOOLITTLE.

REFERENCES CITED

The following references are of record in the file of this patent:

UNITED STATES PATENTS

| Number | Name | Date |
| --- | --- | --- |
| D. 86,014 | Diller | Jan. 19, 1932 |
| D. 103,963 | Butler | Apr. 16, 1937 |
| 173,506 | Siddall | Feb. 15, 1876 |
| 505,837 | Lewis | Oct. 3, 1893 |
| 617,284 | Darnes | Jan. 3, 1899 |
| 756,230 | Goddard | Apr. 5, 1904 |
| 891,307 | Walsh | June 23, 1908 |
| 925,853 | Tompkins | June 22, 1909 |
| 1,285,657 | Finucan | Nov. 26, 1918 |
| 1,863,743 | Burns | June 21, 1932 |
| 1,933,673 | Krajnc | Nov. 7, 1933 |
| 2,452,826 | Backs | Nov. 2, 1948 |